United States Patent
Cornelius et al.

(10) Patent No.: US 10,749,863 B2
(45) Date of Patent: Aug. 18, 2020

(54) SYSTEM, APPARATUS AND METHOD FOR PROVIDING CONTEXTUAL DATA IN A BIOMETRIC AUTHENTICATION SYSTEM

(71) Applicant: Intel Corporation, Santa Clara, CA (US)

(72) Inventors: Cory Cornelius, Portland, OR (US); Jason Martin, Beaverton, OR (US); Ramune Nagisetty, Portland, OR (US); Micah J. Sheller, Hillsboro, OR (US); Thao W. Xiong, Hillsboro, OR (US); Reese Bowes, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 15/439,224

(22) Filed: Feb. 22, 2017

(65) Prior Publication Data

US 2018/0239976 A1      Aug. 23, 2018

(51) Int. Cl.
*H04L 29/06*        (2006.01)
*G06F 1/16*          (2006.01)
*H04W 12/06*         (2009.01)
*G06K 9/00*          (2006.01)
*H04W 12/00*         (2009.01)

(52) U.S. Cl.
CPC ........ *H04L 63/0853* (2013.01); *G06F 1/163* (2013.01); *G06K 9/00885* (2013.01); *H04L 63/0807* (2013.01); *H04L 63/0861* (2013.01); *H04W 12/06* (2013.01); *G06K 2009/00939* (2013.01); *H04L 2463/121* (2013.01); *H04W 12/00508* (2019.01)

(58) Field of Classification Search
None
See application file for complete search history.

(56) References Cited

U.S. PATENT DOCUMENTS

| 9,597,567 | B1 * | 3/2017 | Tran | A63B 60/46 |
| 10,154,460 | B1 * | 12/2018 | Miller | H04W 52/0254 |
| 2013/0268767 | A1 * | 10/2013 | Schrecker | G06F 21/31 |
| | | | | 713/185 |
| 2014/0300490 | A1 | 10/2014 | Kotz et al. | |
| 2015/0265217 | A1 * | 9/2015 | Penders | A61B 5/721 |
| | | | | 600/301 |

(Continued)

FOREIGN PATENT DOCUMENTS

WO    WO-2007/060016 A2 * 11/2006

*Primary Examiner* — David Perlman
(74) *Attorney, Agent, or Firm* — Trop, Pruner & Hu, P.C.

(57) ABSTRACT

In one embodiment, an apparatus includes: a bioimpedance sensor to generate bioimpedance information based on bioimpedance sample information from at least some of a plurality of electrodes to be adapted about a portion of a person; at least one biometric sensor to generate biometric information based on biometric sample information from at least some of the plurality of electrodes; at least one environmental sensor to generate environmental context data; and an integration circuit to receive the bioimpedance information, the biometric information and the environmental context data and to adjust the bioimpedance information based at least in part on a value of one or more of the biometric information and the environmental context data. Other embodiments are described and claimed.

19 Claims, 8 Drawing Sheets

(56) References Cited

U.S. PATENT DOCUMENTS

2015/0282768 A1* 10/2015 Luna .................... A61B 5/721
  600/301
2016/0306955 A1   10/2016 Martin et al.
2017/0091567 A1*  3/2017 Wang ................. A61B 5/02028

* cited by examiner

SYSTEM, APPARATUS AND METHOD FOR PROVIDING CONTEXTUAL DATA IN A BIOMETRIC AUTHENTICATION SYSTEM

TECHNICAL FIELD

Embodiments relate to user authentication using biometric information.

BACKGROUND

In many electronic devices, user authentication may be based at least in part on biometric authentication. Bioelectrical-based biometrics rely on unique electrical properties of physiology to recognize an individual.

DETAILED DESCRIPTION

Figure 1:
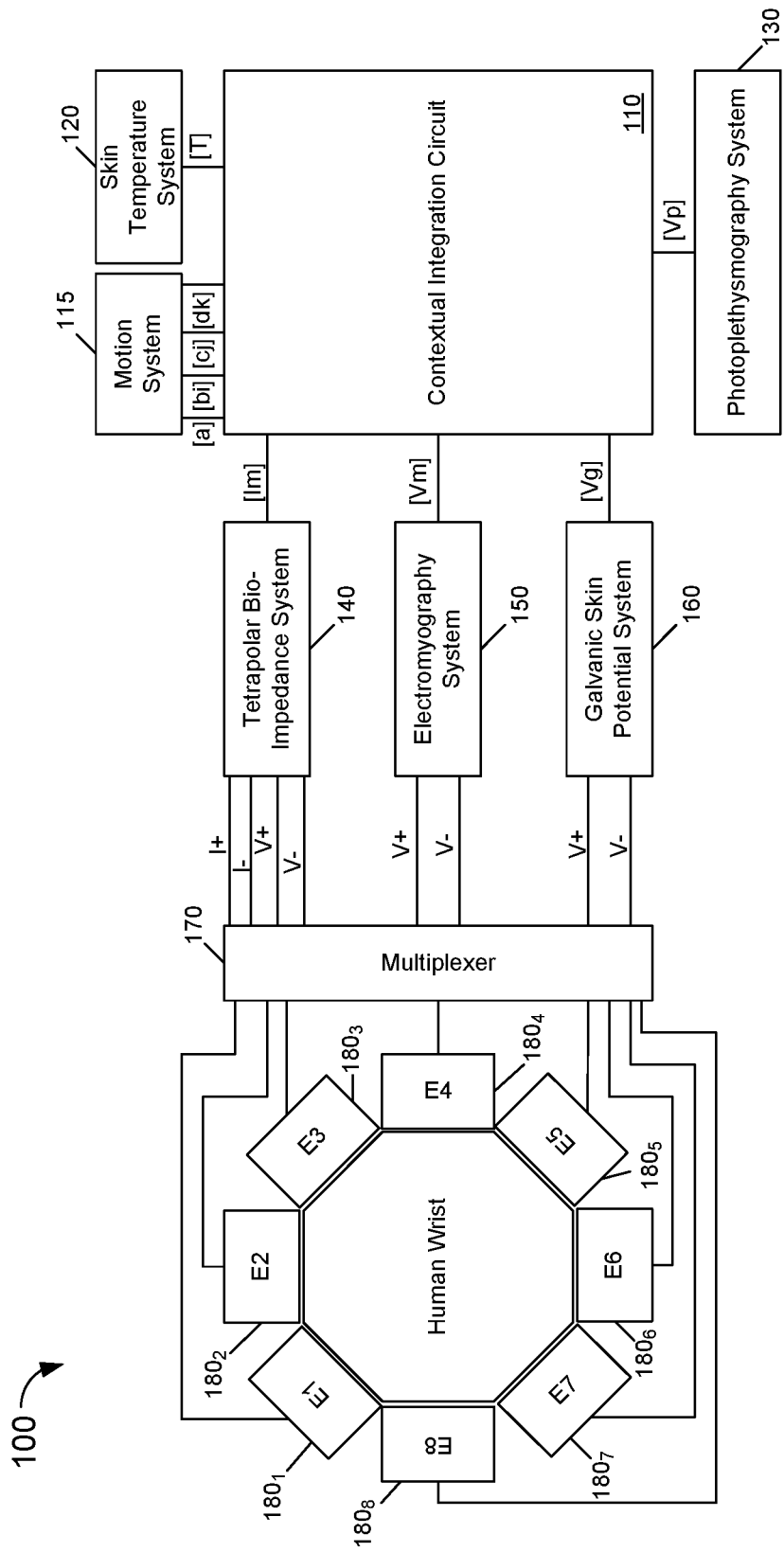
FIG. 1 is a block diagram of a system in accordance with an embodiment of the present invention.

Because bioelectric-based biometrics that use electrical properties of physiology involve an electrode-skin interface with which to sense the desired bioelectrical property, these biometrics often suffer from states and activities that can affect sensing. For example, a subject could perspire and release sweat onto the electrode-skin interface, or movement may change the contact of the electrode on the skin. Current techniques do not adequately address these potential causes of measurement degradation.

In various embodiments, a computing system may be configured to collect and label multiple biometric and environmental conditions and/or activities, and use them as contextual feedback information to increase the real-world robustness of bioimpedance for use as a biometric for authentication.

In a particular embodiment, a system may be adapted to perform biometric-based authentication (for at least some applications) using a bioimpedance-based biometric system as a primary means of authentication. To improve accuracy and fidelity of measurements, embodiments may further use additional biometric and environmental sensing systems to collect contextual information substantially contemporaneously with a given bioimpedance sampling period. For example, embodiments may sense this additional context information before, during, and/or after given bioimpedance samples.

In different embodiments, a selected plurality of additional biometric and environmental context sensing systems may be provided. In a particular embodiment, five systems (in addition to a bioimpedance sensing system) may be provided. These systems may include electromyography, galvanic skin potential, motion, skin temperature, and photoplethysmography sensing systems. Information from each of these sensors may be provided to a context integration circuit. In embodiments, this integration circuit may process information from these sensors (or at least some of these sensing systems) and manipulate or otherwise affect a bioimpedance sample based on this information. For example, based on one or more of the sensed context information, a bioimpedance sample value can be adjusted, masked, discarded or so forth. In this way, the integration circuit can be used to generate a biometric authentication score or value that is more robust to electrode-skin interface changes, environmental changes, and/or physiological changes. In various embodiments, various combinations of less than all of the above-described biometric and environmental context sensing systems may be used.

Using the additional context sensing systems described herein, embodiments may integrate this contextual information into an authentication decision. In particular embodiments, sensors may be used to measure a skin-electrode interface, environmental effects, and physiological effects that can alter a bioimpedance sample. In this way, a bioimpedance-based biometric system is robust to different activities that a wearable device or other electronic device incorporating biometric systems would encounter when deployed in the real world.

Embodiments may be used to perform non-invasive passive authentication of subjects that can be integrated into a wearable device or other portable electronic device. Referring now to FIG. 1, shown is a block diagram of a system in accordance with an embodiment of the present invention. More specifically, system 100 shown in FIG. 1 is a biometric sensing and processing system. In the embodiment of FIG. 1, system 100 is implemented as a wearable device, such as a wrist-worn device to be adapted about a person's wrist in order to obtain a variety of sensed information regarding the person and the person's environment. As will be described herein, this information may be used for various purposes, including to identify and authenticate a person as a known individual.

Once authenticated, an indication of the authentication can be presented, e.g., by way of a beacon message including a token or other indication of authentication to other computing devices, control systems or so forth with which system 100 comes in proximity. In some cases, the wearable device may be a commercially available fitness or health monitor or other tracker. In other cases, the wearable device may be used solely as an authentication factor to provide strong assurance that the wearable device is worn by an authorized user and to communicate this authentication to other systems.

While the following discussion proceeds for an example in which computing system 100 is a wrist-worn fitness tracker, understand the scope of the present invention is not limited in this regard. System 100 may take other form factors worn in other ways, may have one or more sensor components local to a person, with the local sensor component(s) communicating with other components located at a remote location, or have other arrangements.

As seen, system 100 includes a contextual integration circuit 110 (also referred to herein as an "integration circuit"). Circuit 110 may be implemented as a processing device. For example, in some embodiments integration circuit 110 may be a dedicated processing core, microcontroller or other control logic, e.g., of a multi-core processor. In other cases, integration circuit 110 may be implemented as a dedicated or programmable circuit within one or more cores of such multi-core processor or of another integrated circuit.

As will be described herein, integration circuit 110 is configured to receive a variety of incoming information types and analyze the information to identify a user, and where possible to authenticate the user as an authenticated user. To this end, integration circuit 110 may be configured to base authentications primarily according to bioimpedance information. However, as will be described herein in certain situations this bioimpedance information may not be fully reliable for a variety of reasons. Accordingly, integration circuit 110 is configured to use additional biometric and environmental information to provide context to the received bioimpedance information to enable user identification and authentication as described herein. Integration circuit 110 is configured to concurrently collect data from at least some of the contextual system components and biometric information from the bioimpedance system.

System 100 includes a plurality of electrodes $180_1$-$180_8$ that gather biometric information. In the example of a wrist-worn device, electrodes $180_1$-$180_8$ may be adapted about a user's wrist. However understand the scope of the present invention is not limited in this regard and in other embodiments more or fewer electrodes may be present. Still further, while a wrist-worn wearable device is described herein understand that in other embodiments system 100 may be adapted about other portions of a user, for example, about an ankle, a finger or another user body part. In the wrist-worn example, an integrated wristband housing may house all the components shown in FIG. 1. However in other embodiments, it is possible for various components to be separately located and information can be wirelessly communicated between different components. In some examples, electrodes 180 of system 100 may be separated from the rest of system 100 and may be embedded in an article of clothing or accessory, while some or all of the rest of system 100 is located elsewhere, such as worn in close proximity to the person being located in another electronic device such as a smartphone, or even a remotely located device.

In fact in some cases it is possible for integration circuit 110 itself to be located remotely from the other components. For example, in a body area network individual sensors or other components may be adapted about different portions of a user (or implemented with the user), and these individual components can in turn communicate to a primary controller which may be implemented, as an example within a user's smartphone or other small portable electronic device.

In the embodiment shown in FIG. 1, a plurality of different sensors are coupled to integration circuit 110. These sensors include biometric-based sensors and environmental-based sensors. More specifically, a bioimpedance sensor 140, an electromyography (EMG) sensor 150, a galvanic skin potential sensor 160, and a photoplethysmography (PPG) sensor 130 all couple to integration circuit 110. Aspects of each of these biometric sensors are discussed further below. In addition, integration circuit 110 also receives information from environmental sensors including one or more motion sensors 115 and one or more thermal sensors 120. Of course understand while shown with these particular sensors in the embodiment of FIG. 1, more or fewer sensors may be present in other embodiments and different selections of sensors may exist in another embodiment. And understand that system 100 of course may include additional components. For example, in an implementation in which system 100 is a fitness tracker, a display may be provided to communicate monitored information and so forth to a user. Still further understand that system 100 may include a radio device such as a wireless circuit that can wirelessly communicate with other devices. In some cases this wireless communication may be via a short range wireless communication technique such as via a Bluetooth™ connection or a wireless local area network such as in accordance with a given Institute of Electrical and Electronics Engineers (IEEE) 802.11 standard. In still other cases, wireless communications may occur in a wider area, such as via a cellular network. Understand that still further sensors and other components may be present in a given system. For example, in some cases system 100 also may include a global positioning system (GPS) sensor to identify a location at which the system is present.

In any case, information from one or more of the sensors may be used to aid in characterization/verification of information obtained from bioimpedance sensor 140, namely bioimpedance information, [Im], which is an internal image computed from a plurality of collected surface voltages. This is the case, as potentially wide variations in readings may occur during use due to changes in coupling of bioimpedance sensor 140 with the user, as well as environmental conditions, including sweat or other moisture that couples between the user and bioimpedance sensor 140, increased blood flow, muscle activity, skin temperature and so forth.

Bioimpedance sensor 140 measures bioimpedance by applying a sinusoidal alternating current between a first or stimulus pair of electrodes 180. The injected current establishes an electrical field within the skin and underlying tissue and results in a measurable voltage difference between electrodes 180. Alternately, a second or sensing pair of electrodes 180 located between, near, or distance from the stimulus pair of electrodes 180 may be used to sense voltage differences due to the electric field in the tissue, automatically ignoring potentially-high skin-contact resistances. This potential difference is measured, and is expected to be a function of the underlying tissue impedance, according to Ohm's law, $V=IZ$, which relates the voltage V and current I to the bioimpedance Z of the tissue.

In embodiments, since different tissue types exhibit dispersive characteristics, meaning that their electrical properties are dependent on the frequency at which they are measured, bioimpedance sensor 140 may adjust the frequency of the alternating current over a specific band, recording impedance at each of several frequencies. The anatomy of the forearm proximal to the wrist includes skeletal bones, arteries, veins, nerves, muscles, adipose, skin, and interstitial fluids. Over a frequency range of, e.g., 10 kilohertz (kHz) to 10 megahertz (MHz), reported values of bone conductivity and adipose conductivity are relatively stable. In muscle, skin, and blood, however, the conductivity monotonically increases with frequency. Person-to-person differences at the wrist include: size, skin thickness, skin water content, bony anatomy and size, vascular branch size and locations, sub-dermal water content, and adipose/muscle/bone/vasculature content within the sensing region.

In an embodiment, by switching through multiple pairings of electrodes 180, a set of bioimpedance measurements associated with a person's wrist can be recorded and used to generate a bioimpedance image for authentication as described herein. In one embodiment, bioimpedance sensor 140 is implemented as a tetrapolar device to apply current between electrodes 180 that are directly across from each other and measure voltage from the other electrodes 180 that are directly across from each other.

Given a set of frequencies and their corresponding bioimpedance measurements, integration circuit 110 may extract a plurality of features from each bioimpedance measurement to form a feature vector. These features include the maximum magnitude of all the bioimpedance measurements. Other features may capture the shape of a plot of the bioimpedance measurements as a whole. From these features, a bioimpedance image may be generated that is used as an authentication factor. In an embodiment this bioimpedance image may include individual images of both components of impedance, magnitude and phase, generated for each frequency, where each frequency captures information regarding different kinds of tissue.

Still with reference to FIG. 1, note that a multiplexer 170 or other selection circuit may couple between electrodes 180 and bioimpedance sensor 140, EMG sensor 150 and galvanic skin potential sensor 160. Integration circuit 110 may include control circuitry to provide control signals to cause multiplexer 170 to provide and receive appropriate signals to/from corresponding electrodes 180 and interface them to the various sensors, e.g., during a reading phase. As illustrated, bioimpedance sensor 140 is configured to send current information and receive voltage information from certain electrodes 180, while EMG sensor 150 and galvanic skin potential sensor 160 are configured to receive voltage information from one or more electrodes 180. Each of sensors 140, 150 and 160 are configured to receive these signals and process them to generate biometric values. More specifically, bioimpedance sensor 140 is configured to generate a bioimpedance image that provides a so-called bioimpedance signature of a user. In turn, EMG sensor 150 is configured to provide electromyographic information regarding muscle activity, while galvanic skin potential sensor 160 is configured to provide galvanic potential information regarding electrodermal response.

Note that PPG sensor 130 may be implemented as a separate sensing device. To this end, PPG sensor 130 may include a light emitting diode (LED) or other illumination source that is caused to illuminate the skin and receive a response indicative of a heart rate, e.g., based on changes in color of the illuminated light. Motion sensor 115 may be implemented as one or more accelerometers to provide information regarding motion of the user. Finally, one or more thermal sensors 120 may provide an indication of the user's temperature, at least as measured at a contact point between the user and system 100.

In an embodiment, EMG system 150 collects information related to the electrical activity of striated muscle at or near to the skin-electrode interface. During voluntary contraction, a small electric potential is induced due to the production of action potentials by the striated muscle. These voltage readings, [Vm], are collected and may be used to mitigate any interference by muscle activity in bioimpedance system 140.

In an embodiment, galvanic skin potential system 160 detects changes in the voltage potential of sweat glands due to psychological or physiological arousal. Such states can change a bioimpedance reading because the excreted sweat alters the electrode-skin interface via reduced resistance. This signal, [Vg], provides context to integration circuit 110 to account for changes in the electrode-skin interface due to sweat.

Motion system 115 collects data related to acceleration and angular velocity and magnetic north using a combination of an accelerometer, gyroscope, and magnetometer, in an embodiment. From this data, a high-level activity feature set ([a], [bi], [cj], [dk]) may be extracted that corresponds to the magnitude of motion present during the sample collection. Motion may induce changes in the electrode-skin interface by altering the contact surface area or position of the electrode. As such, motion system 115 may be used to contextualize a bioimpedance sample taken with significant movement versus those samples taken with little or no motion where the skin-electrode interface is assumed to not have changed.

Skin temperature system 120 may be adapted as one or more temperature sensors in direct contact with the skin near electrodes 180. This system measures the temperature of the skin, [T], which adds a correlated signal to both motion and galvanic skin potential. The combination of these information sources enables integration circuit 110 to determine when bioimpedance samples are taken during periods of exercise, e.g., when a significant amount of sweat may be present due to increased skin temperature.

PPG system 130 measures the heart rate of the subject using an imaging sensor and illumination LED. The imaging sensor directly measures the change in skin color, [Vp], due to micro-flushes from blood moving through a vein. Like skin temperature system 115, this system is used by integration circuit 110 to determine higher-level activities like exercise, where a significant amount of sweat might be present that affects the skin-electrode interface and the physiological parameters of a given bioimpedance sample.

In an embodiment, integration circuit 110 may leverage information from some or all of these context systems and the bioimpedance system to integrate the information into the bioimpedance biometric sample, [Im], in the form of a context. This context thus enables a more robust biometric system, because the biometric system can account for changes in environmental, physiological, or skin-electrode interface parameters that may affect the bioimpedance sample.

Understand while shown at this high level in the embodiment of FIG. 1, many variations and alternatives are possible. While FIG. 1 illustrates specific context sensing system components to mitigate skin-electrode interface problem and related environmental and physiological effects of the subject being measured while performing certain activities, understand that the scope of the present invention is not limited in this regard, and additional or different sensing systems may be present in other embodiments.

Figure 2:
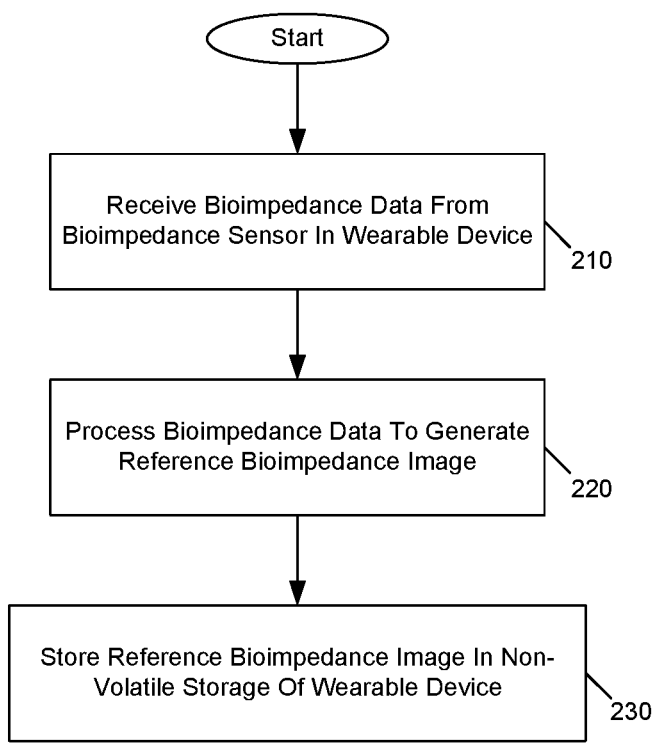
FIG. 2 is a flow diagram of a method in accordance with an embodiment of the present invention.

Referring now to FIG. 2, shown is a flow diagram of a method in accordance with an embodiment of the present invention. More specifically, FIG. 2 illustrates a high level view of an enrollment phase in which a user is enrolled as an authenticated user based at least in part on bioimpedance information. Method 200 of FIG. 2 may be performed by an integration circuit or other processing circuitry of a computing system as described herein. In some cases, method 200 may be performed completely within a wearable device such as system 100 of FIG. 1. In other cases, wearable device 100 may be used to perform sensing and processing. Thereafter, the processed information may be provided, e.g., wirelessly, to another computing system for performing additional processing.

In any event, method 200 begins by receiving bioimpedance data from a bioimpedance sensor in a wearable device (block 210). More specifically, a multiplexer or other selection circuit may be controlled, e.g., by an integration circuit, to send current signals to certain electrodes and in turn receive voltage signals from selected ones of multiple electrodes and provide them to the bioimpedance sensor. At block 220, the bioimpedance sensor may process this bioimpedance data to generate a reference bioimpedance image. This reference bioimpedance image may act as a signature or other unique identifier for a particular user from which the bioimpedance information is obtained. Note that in some cases the bioimpedance sensor itself may perform the generation of the reference bioimpedance image. In other embodiments an integration circuit or other processing circuitry may generate this bioimpedance image.

Note that this reference bioimpedance image is a baseline or template value. To ensure an accurate reading, during this enrollment phase, the integration circuit may analyze other biometric and environmental information to ensure that an accurate reading is possible. For example, the additional biometric and environmental information may be analyzed to ensure that all values are within appropriate ranges. In an embodiment, these ranges may correspond to a threshold range for each sensor type. Each of these threshold ranges is used to indicate an acceptable range for a corresponding sensor reading at which a baseline or template bioimpedance signature may be generated. These ranges thus guarantee that a good connection exists between the user and the wearable device and that no excessive muscle activity, heart rate, sweat or so forth is present that could disrupt or otherwise adversely affect the readings.

Still with reference to FIG. 2, at block 230 this reference bioimpedance image may be stored in a non-volatile storage of the wearable device. As one example, this non-volatile storage may be a flash memory. Understand that the non-volatile storage may provide for storage of multiple reference bioimpedance images, each to be associated with a particular user. In other embodiments, only a single reference bioimpedance image may be stored. In such cases, such as where a user obtains a wearable device, e.g., upon reporting to work in the morning, this reference bioimpedance image may be usable for the worker's shift. Then at the end of the shift when the wearable device is returned, this reference bioimpedance image can be deleted and the device is reset.

Figure 3:
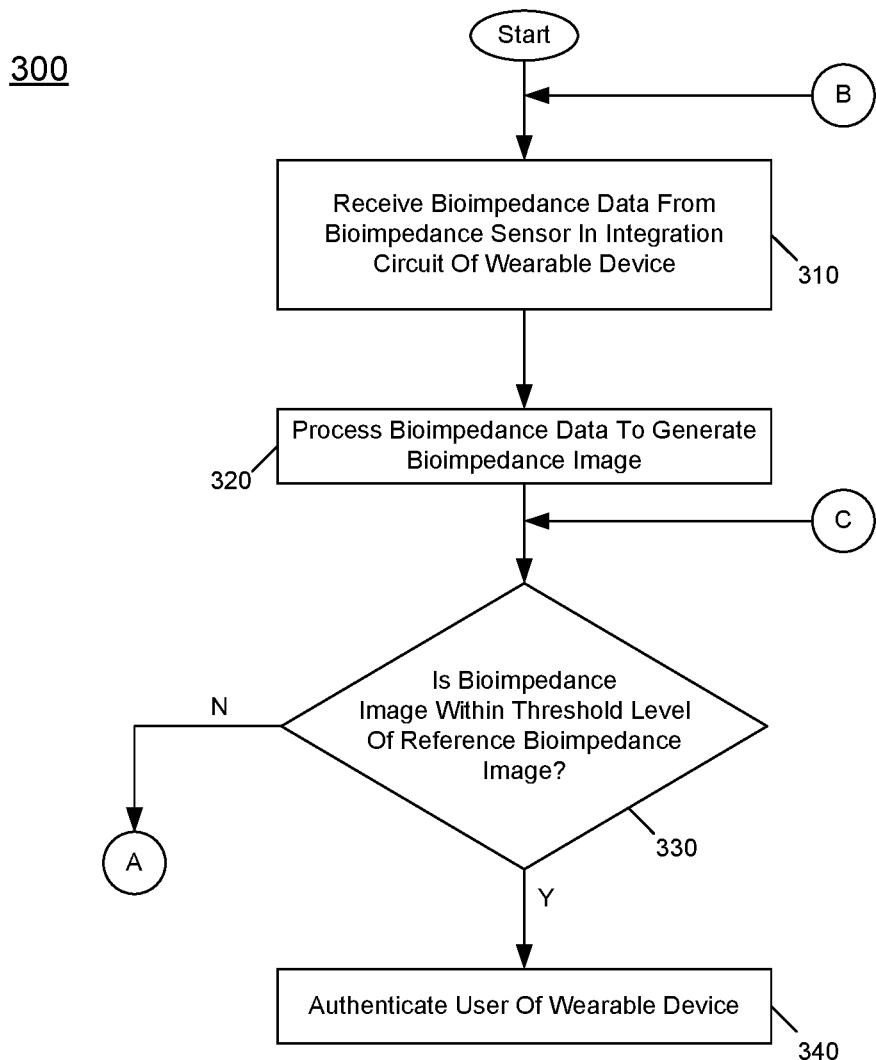
FIG. 3 is a flow diagram of a method in accordance with another embodiment of the present invention.

Referring now to FIG. 3, shown is a flow diagram of a method in accordance with another embodiment of the present invention. More specifically, method 300 shown in FIG. 3 relates to user authentication performed based at least in part on bioimpedance information. In various embodiments, method 300 may be performed by an integration circuit within a wearable device itself, while in other cases, certain information may be provided to another system to perform the authentication.

As illustrated, method 300 begins by receiving bioimpedance data from a bioimpedance sensor within the integration circuit (block 310). This bioimpedance data then can be processed (block 320) to generate a bioimpedance image. Control next passes to diamond 330 to determine whether the bioimpedance image is within a threshold level of a reference bioimpedance image. In an embodiment a pattern matching process may be performed to identify whether a match exists between these two images. Note that this comparison may be between a single reference bioimpedance image present within a non-volatile memory of the wearable device. In other cases, as discussed above there may be multiple stored reference bioimpedance images associated with different users. In such cases, pattern matching may be performed between the obtained bioimpedance image and the multiple reference bioimpedance images to find a best match. Understand that a match may be found where two images are at least substantially similar to each other, e.g., where the two images match to at least a threshold level. In an example, this threshold level to identify a match may be in terms of distance (e.g., how far the verification image is from the enrolled image, e.g., with zero being close and larger values further away).

More specifically, at diamond 330 it is determined whether the bioimpedance image is within a threshold level of the reference bioimpedance image. Although different embodiments are possible, this determination may be based on pattern matching in which different portions of the bioimpedance images are compared to each other to determine whether they match (e.g., to at least a given threshold level). If it is determined that the images match (at least to a threshold level), control passes to block 340 where the user of the wearable device is authenticated. Note that this indication of user authentication can be stored within the wearable device. In some cases, this indication can be included within a token. For example, a proximity token can be generated to identify that the wearable device is associated with an authenticated user. As further described herein in some cases this proximity token may further include a timestamp regarding the time at which this authentication occurred, use of which is described further below. In general, a proximity token may be used in a given authentication scheme to indicate whether a user is wearing (and/or is in close proximity to) the device. Note that as used herein, the term "proximity" may further include, in addition to being adapted about or to a portion of a user, "approximate contact." As used herein, "approximate contact" may mean direct contact with the skin, or separation from the skin by a small air gap on the order of a few centimeters or less (as with a pendant wearable device that may swing a small distance away from the skin when the user leans forward), or contact with a clothing material or accessory through which some index of a nearby human presence can be sensed by one or more sensors in the wearable device. Approximate contact also includes this type of intermittent contact, with loss of contact lasting less than a threshold duration (e.g., on the order of seconds or less).

In addition, this authentication indication can be reported to various other entities. For example, in situations where the wearable device itself includes a display, an indication can be provided on the display to inform the user of his or her authentication. In other cases, an indication of user authentication can be provided to other systems, e.g., wirelessly. For example, this authentication indication can be provided to a smartphone or other small portable device in a wireless local area network with the wearable device. Still further, this indication can be provided to additional systems with which the wearable device comes in proximity, so long as the user remains within at least approximate contact with the wearable device.

As described herein, due to changes in the user's interaction with the wearable device and/or due to user activity (among other possible reasons), potentially wide variations in obtained bioimpedance images may occur. Accordingly if it is determined at diamond 330 that the obtained bioimpedance image is not within a threshold level of the reference bioimpedance image, control passes to method 400 shown in FIG. 4, where operations may be performed to determine whether adjustment or other manipulation of the bioimpedance image is possible based on context information associated with a given bioimpedance sample.

Figure 4:
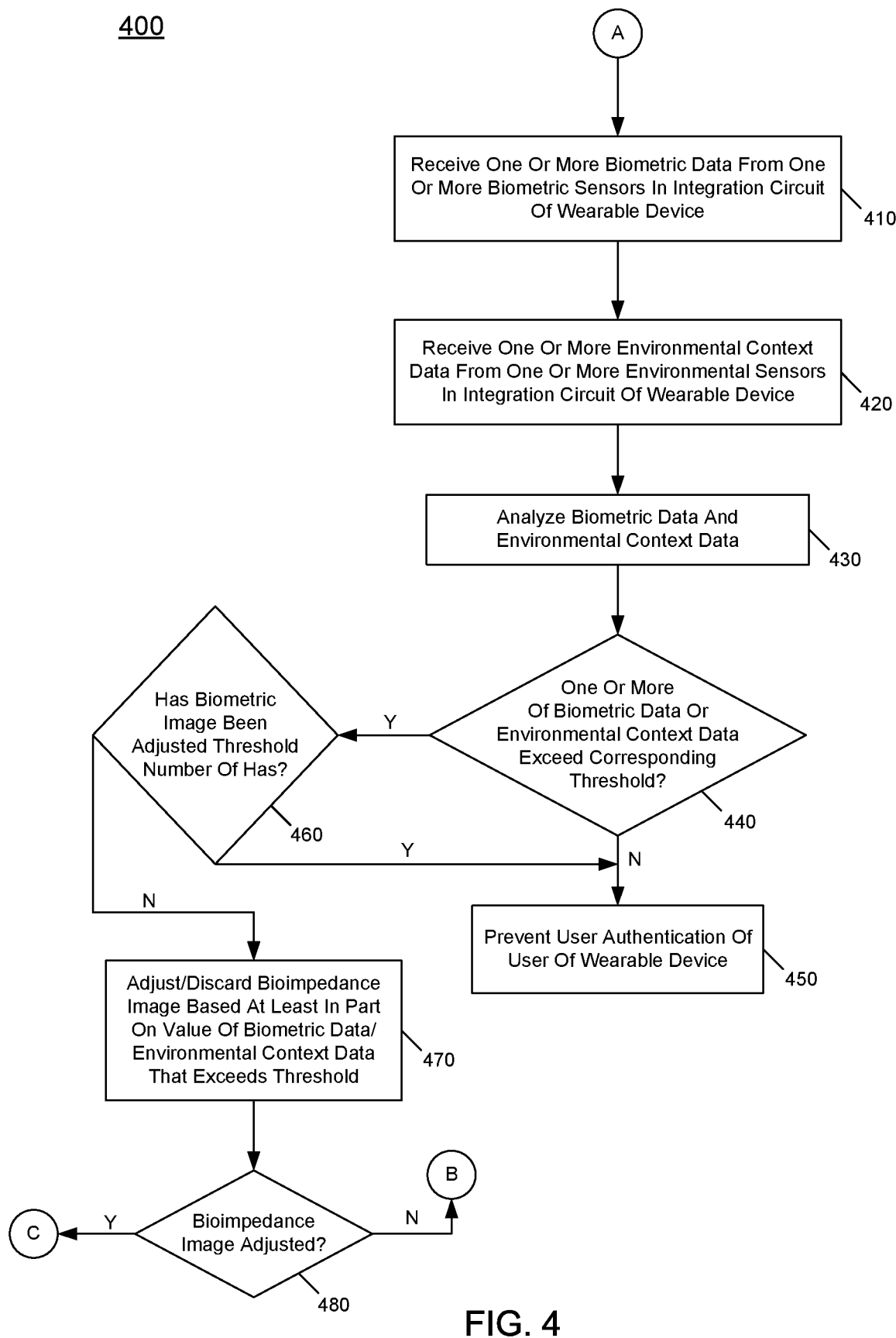
FIG. 4 is a flow diagram of a method for using additional context information in accordance with an embodiment of the present invention.

More specifically, method 400 shown in FIG. 4 is a flow diagram of a method for using additional context information to resolve ambiguities within a bioimpedance image in accordance with an embodiment. Method 400 may be performed within the integration circuit of a wearable device.

Method 400 begins by receiving one or more biometric data from one or more biometric sensors in the integration circuit of the wearable device (block 410). Next one or more environmental context data may be received from one or more environmental sensors (block 420). This environmental context data also may be received in the integration circuit of the wearable device.

Still with reference to FIG. 4, at block 430 the biometric data and the environmental context data are analyzed, e.g., within the integration circuit. Next control passes to diamond 440 where it may be determined whether one or more of the biometric data or the environmental context data exceed a corresponding threshold. In embodiments, each type of biometric data and environmental context data may be associated with a given threshold. These thresholds can be used to identify whether acceptable conditions are present for realizing suitable bioimpedance readings. Stated another way, the context data can be compared to these thresholds to identify whether suitable bioimpedance information is available. For purposes of the discussion in FIG. 4, it is assumed that this analysis at diamond 440 is as to whether a given sensed data exceeds a corresponding threshold. In many cases, instead of a determination as to a sensed data exceeding a threshold, the inquiry may be to determine whether the sensed data is within an acceptable range or threshold range of values. However, for purposes of discussion in FIG. 4 assume that the analysis is as stated, namely as to whether any of the sensed data exceed a corresponding threshold.

When one or more of these data exceed a corresponding threshold, such as when a user's muscle activity exceeds a certain threshold, heart rate exceeds a certain threshold, and/or sweat exceeds a given threshold, bioimpedance information processing may be impaired. If all of these data indicate that no threshold has been exceeded (as determined at diamond 440), control passes to block 450 where user authentication is prevented. That is, in this case variations in user activity levels and/or environment likely do not cause excessive changes to the bioimpedance information. As such, the differences between an obtained bioimpedance image and a reference bioimpedance image cannot be reconciled, and thus a user authentication is not indicated.

Still with reference to FIG. 4, instead if it determined that one or more of the biometric data or environmental context data exceeds its given threshold, control passes to diamond 460 where it can be determined whether the bioimpedance image has been adjusted a threshold number of times. That is, as discussed below when the context data indicates that a suitable bioimpedance reading may not be possible, adjustment to an obtained bioimpedance sample may occur. However, if multiple adjustments to a given image occur, fidelity of the image may not be maintained. As such, only a threshold number of adjustments to a given bioimpedance image may be allowed before preventing a user authentication (with control passing from diamond 460 to block 450). Although the scope of the present invention is not limited in this regard, in an embodiment the threshold number of bioimpedance image adjustments allowed may be a relatively small number, e.g., between three and five, in one embodiment.

If it is determined that the number of previous adjustments to a given bioimpedance image has not reached this threshold number, control passes from diamond 460 to block 470. At block 470 the obtained bioimpedance information may be adjusted or discarded based on one or more of the context values exceeding their threshold (such as where the given context value is outside of a threshold range). That is, for some sensing systems, if a given threshold is exceeded, an adjustment may be made to the bioimpedance image. In other cases, adjustment may be not be appropriate and instead, a given bioimpedance image sample may be discarded and a new bioimpedance image can be obtained.

Adjustment of bioimpedance images may take different forms in different embodiments (and based upon the given one or more context sensors that is outside a corresponding threshold range). In some cases an adjustment may be performed by masking one or more portions of a bioimpedance image. In other cases, a signal level of a bioimpedance image may be adjusted. Still further types of adjustments are possible in other embodiments.

In particular examples, bioimpedance image adjustment may be by way of masking given portions of a corresponding bioimpedance image. Although the scope of the present invention is not limited in this regard in cases where EMG or PPG sensed data exceed their thresholds, the bioimpedance image may have at least a portion thereof masked. For example, when high muscle activity is indicated by way of EMG data, a muscle-based portion of the bioimpedance image may be masked. Instead in another example, when the PPG biometric data exceeds its threshold indicating higher than normal blood flow, a blood-based portion of the bioimpedance image may be masked.

As further examples of bioimpedance adjustments, signal levels can be adjusted based on context sensing information that exceeds given thresholds. For example, when the galvanic skin potential data exceeds a corresponding threshold, an adjustment to a bioimpedance image may be by way of signal level changes, such as normalizing image information to adjust the image to baseline levels so that appropriate comparison with a reference bioimpedance image may occur. In yet further examples, when sensed motion information value exceeds its corresponding threshold, the bioimpedance image can simply be discarded.

As further illustrated in FIG. 4, control passes from block 470 (where a given bioimpedance image is adjusted or discarded) to determine at diamond 480 whether the image was adjusted. If it is determined that the image was not adjusted (the sample instead being discarded), control passes back to block 310 of FIG. 3 to obtain additional bioimpedance information for use in performing an authentication. Thus in this situation, because accuracy of a given bioimpedance sample could not be guaranteed, another sample is obtained and the user authentication process begins again.

Instead when it is determined at diamond 480 that an adjustment has occurred to a given bioimpedance image (such as when a given bioimpedance image has a portion masked), the pattern matching process of user authentication in FIG. 3 may proceed again (at diamond 330). Note that in cases where the adjustment is by way of masking at least a portion of a bioimpedance image, the corresponding unmasked portion can then be provided (with reference back to FIG. 3) to determine whether this unmasked portion of the biometric image is within a threshold level of the corresponding unmasked portion(s) of the reference bioimpedance image (at diamond 330). If so, user authentication may occur at block 340 as discussed above. This is so, as even in the face of impaired bioimpedance measurements due to user activity and/or other environmental reason, a sufficient bioimpedance image can be obtained and used for authentication purposes. Understand while shown at this high level in the embodiment of FIG. 4, many variations and alternatives are possible.

Figure 5:
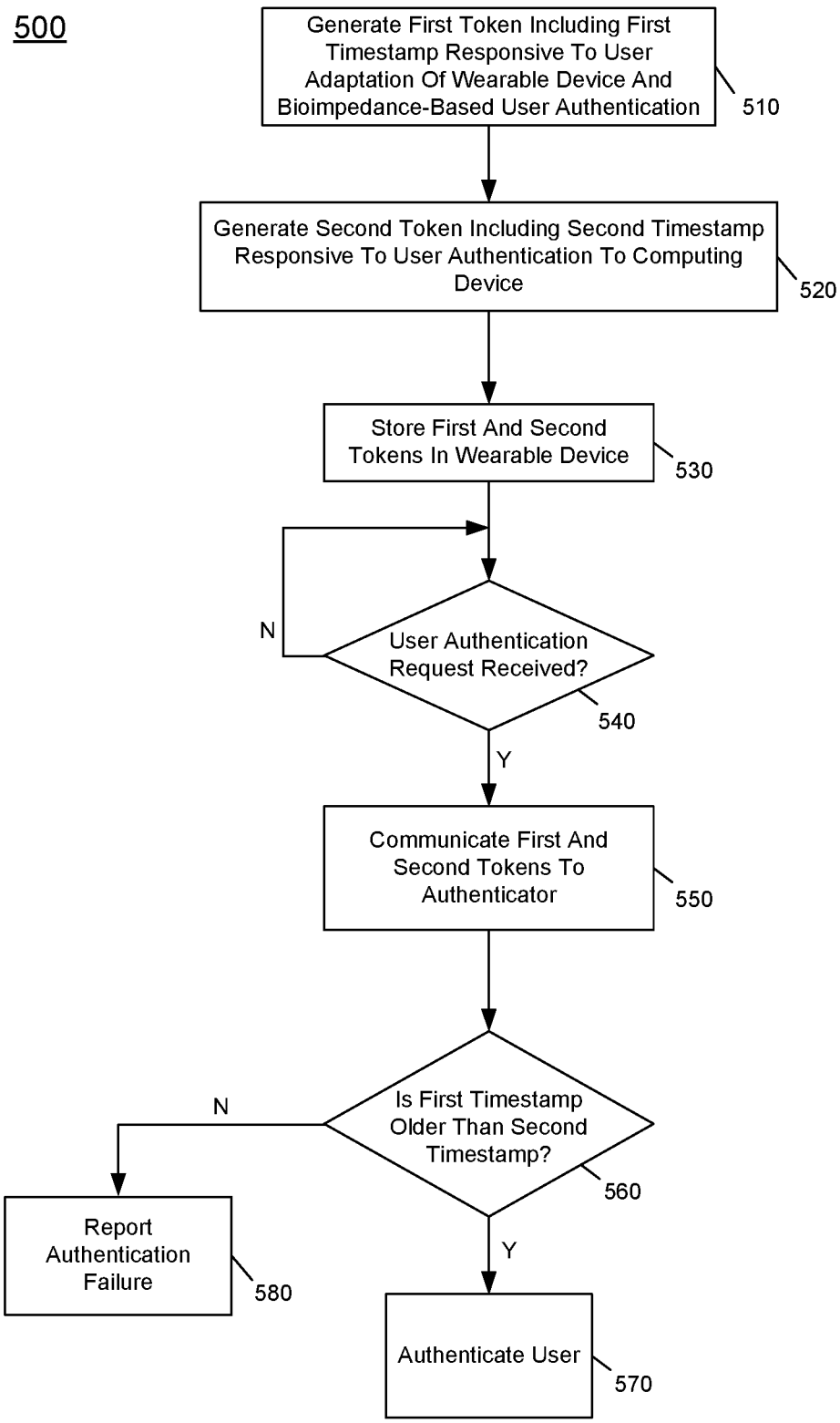
FIG. 5 is flow diagram of a method for user authentication in accordance with an embodiment of the present invention.

Referring now to FIG. 5, shown is flow diagram of a method for authentication in accordance with an embodiment of the present invention. Method 500 may be performed by various combinations of hardware circuitry, software, and/or firmware, including hardware-based logic in one or more computing devices to enable creation of multiple tokens for use in initial and successive authentications of a user to one or more computing devices with minimal or no user involvement.

As shown, method 500 begins by generating a first token including a first timestamp (block 510). This first token may be generated responsive to user adaptation of a wearable device. As such, this first token may be generated, e.g., in the wearable device itself, when the user puts on the wearable device or otherwise places the wearable device in at least approximate contact with the user. Note that the first timestamp included in this first token may be associated with the time at which the user puts on or otherwise adapts the wearable device.

In embodiments here, this token generation may further occur responsive to a biometric-based user authentication. More specifically as described herein this user adaptation of a wearable device such as a wrist-worn device triggers a user authentication where bioimpedance information as well as contextual data from one or more biometric sensors and one or more environmental context sensors may be obtained. From this information, a comparison between a bioimpedance image and a reference bioimpedance image may be performed to determine whether the user is authenticated. If the comparison does not result in a match (at least to a threshold level), the contextual data can be used to update the bioimpedance image to attempt to authenticate the user. It may be assumed for purposes of discussion in FIG. 5 that this bioimpedance-based user authentication is successful prior to generating this proximity token.

Next, control passes to block 520 where a second token is generated including a second timestamp. This second token generation may be responsive to a user authentication to a computing device, e.g., separate from the wearable device. This second timestamp may be associated with a time at which the user authentication occurs. For example, assume that the computing device is a smartphone, tablet computer, laptop computer, desktop computer or other computing platform that the user seeks to access. For purposes of discussion, assume that this second device is the user's work computer. Note that this token may be associated with a particular factor of authentication which can vary in different embodiments. As such, the strength and type of authentication can be part of the information stored in the token. Furthermore, understand that for the high level view shown in FIG. 5, only a single factor authentication is described. In many cases however the initial user authentication may be according to a multi-factor authentication such that a plurality of tokens can be generated in this user authentication.

Still with reference with to FIG. 5, control next passes to block 530 where these first and second tokens may be stored in the wearable device. In this embodiment where the second token is generated in the separate computing device, a communication of this second token to the wearable device may occur to enable storage of this second token and the first token in a storage of the wearable device. In an embodiment, this storage may be a non-volatile storage that includes at least some amount of a secure storage such that the tokens may be stored and later accessed while the wearable device is in a trusted execution environment. In other cases, the tokens may be encrypted or otherwise protected in another manner such that the storage and accessing can occur outside of a trusted execution environment.

Still with reference to FIG. 5, next it is determined whether a user authentication request is received (diamond 540). If so, control passes to block 550. Note that this user authentication request may be responsive to the user seeking to later access the same computing device or another device associated with the user, or responsive to a re-authentication time period elapsing. Responsive to this request, which may be received by the wearable device at block 550, the first and second tokens can be communicated to an authenticator or verifier. In the case where this user authentication request is for the user to access the computing device described above, the authenticator may be the computing device itself. In other usage models understand that the authenticator may be another device, including a remote authentication service of an identity provider such as accessible via the Internet.

Still referring to FIG. 5, at diamond 560 it is determined whether the first timestamp is older than the second timestamp. This determination, if successful, indicates that the user was wearing the wearable device prior to first authenticating to the computing device and has not removed the wearable device since that time. This may be ensured in various embodiments by causing the wearable device to delete or otherwise remove the tokens when the user removes or otherwise disassociates from the wearable device. In this or other cases, the disassociation of the user from the wearable device may otherwise be communicated to appropriate computing devices and/or authenticator. Also understand that this determination at diamond 560 may be according to a particular security policy and in other cases, such timestamp-based confirmation may not be required.

However for purposes of illustration in FIG. 5, if it is determined that the first timestamp is not older than the second timestamp, control passes to block 580 where an authentication failure may be reported. As such, the user may be prevented from access to the computing device or at least be prevented from access to secure information, such as preventing the user from entering into a secure session with the computing device. Otherwise if it is determined that the first timestamp is older than the second timestamp, control passes to block 570 where the user is authenticated and thus may access protected portions of the computing system and enter into a secure session. Understand while shown at this high level in the embodiment of FIG. 5 many variations and alternatives are possible.

Figure 6:
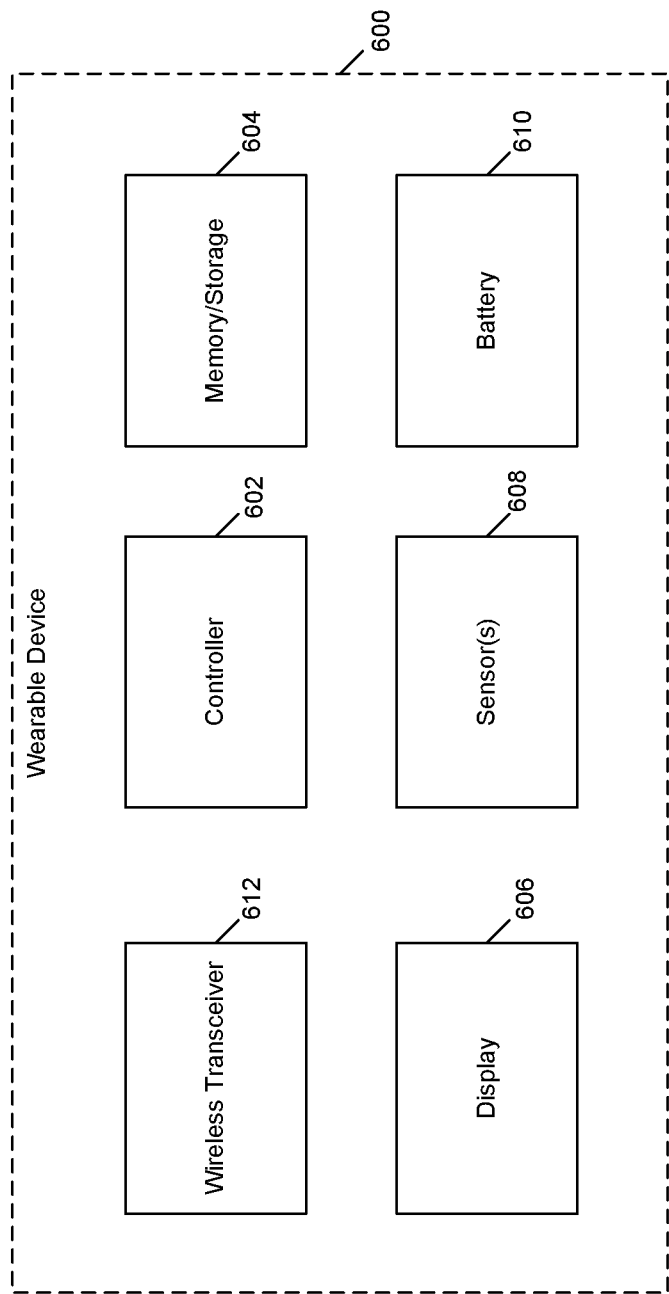
FIG. 6 is a block diagram of a wearable device in accordance with an embodiment of the present invention.

FIG. 6 is a block diagram of a wearable device in accordance with an embodiment of the present invention. In some embodiments, wearable device 600 may include a controller 602 (e.g., microcontroller), memory and/or storage 604 that may be a combination of volatile and non-volatile memory and storage, display 606, one or more sensors 608 (e.g., accelerometer, temperature, biometric sensors including a bioimpedance sensor, EMG, PPG, and galvanic sensors, etc.), a power source 610 (e.g., a battery), and a wireless transceiver 612 to communicate with the other devices. In some embodiments, controller 602 is configured to control bioimpedance collection based at least in part on context information obtained from other sensors.

Figure 7:
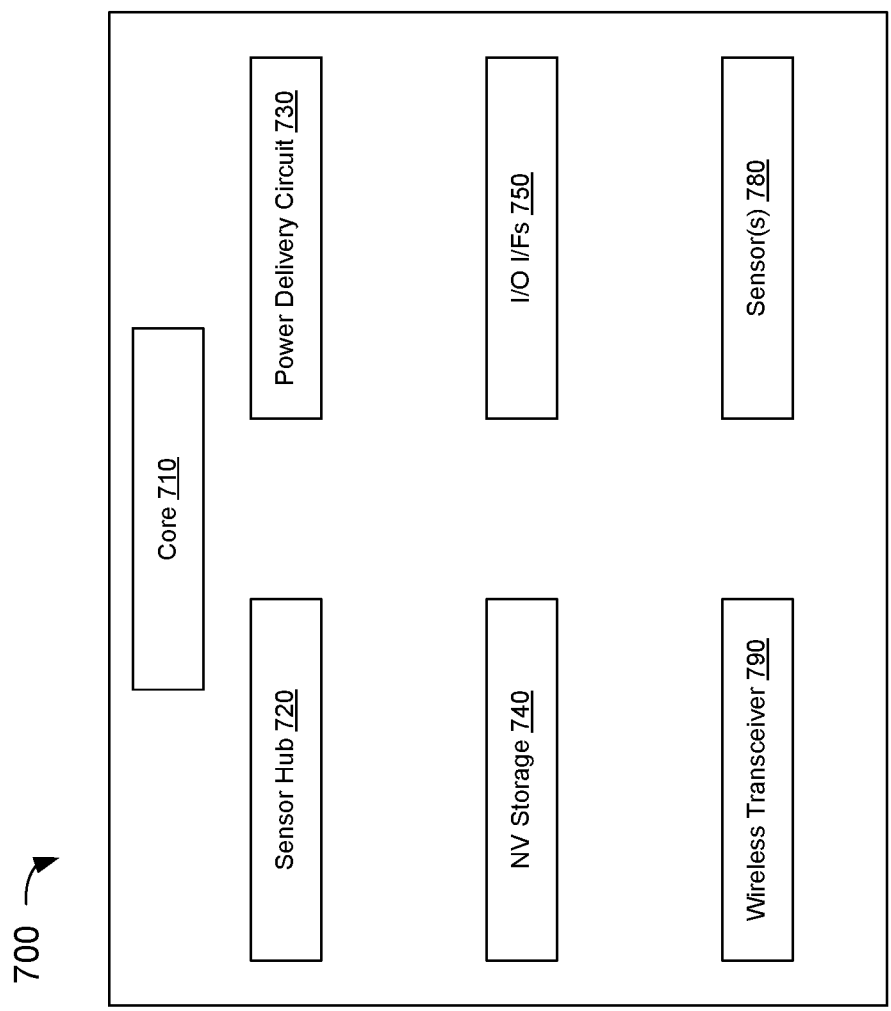
FIG. 7 is a block diagram of a wearable module in accordance with another embodiment of the present invention.

Referring now to FIG. 7, shown is a block diagram of a wearable module 700 in accordance with another embodiment. In one particular implementation, module 700 may be an Intel® Curie™ module that includes multiple components adapted within a single small module that can be implemented as all or part of a wearable device. As seen, module 700 includes a core 710 (of course in other embodiments more than one core may be present). Such core may be a relatively low complexity in-order core, such as based on an Intel Architecture® Quark™ design. Core 710 couples to various components including a sensor hub 720, which may be configured to interact with a plurality of sensors 780, such as one or more biometric, motion, environmental or other sensors, including a bioimpedance sensor. A power delivery circuit 730 is present, along with a non-volatile storage 740. In an embodiment, this circuit may include a rechargeable battery and a recharging circuit, which may in one embodiment receive charging power wirelessly. One or more input/output (10) interfaces 750, such as one or more interfaces compatible with one or more of USB/SPI/I²C/GPIO protocols, may be present. In addition, a wireless transceiver 790, which may be a Bluetooth™ low energy or other short-range wireless transceiver, is present to enable wireless communications as described herein. Understand that in different implementations a wearable module can take many other forms.

Figure 8:
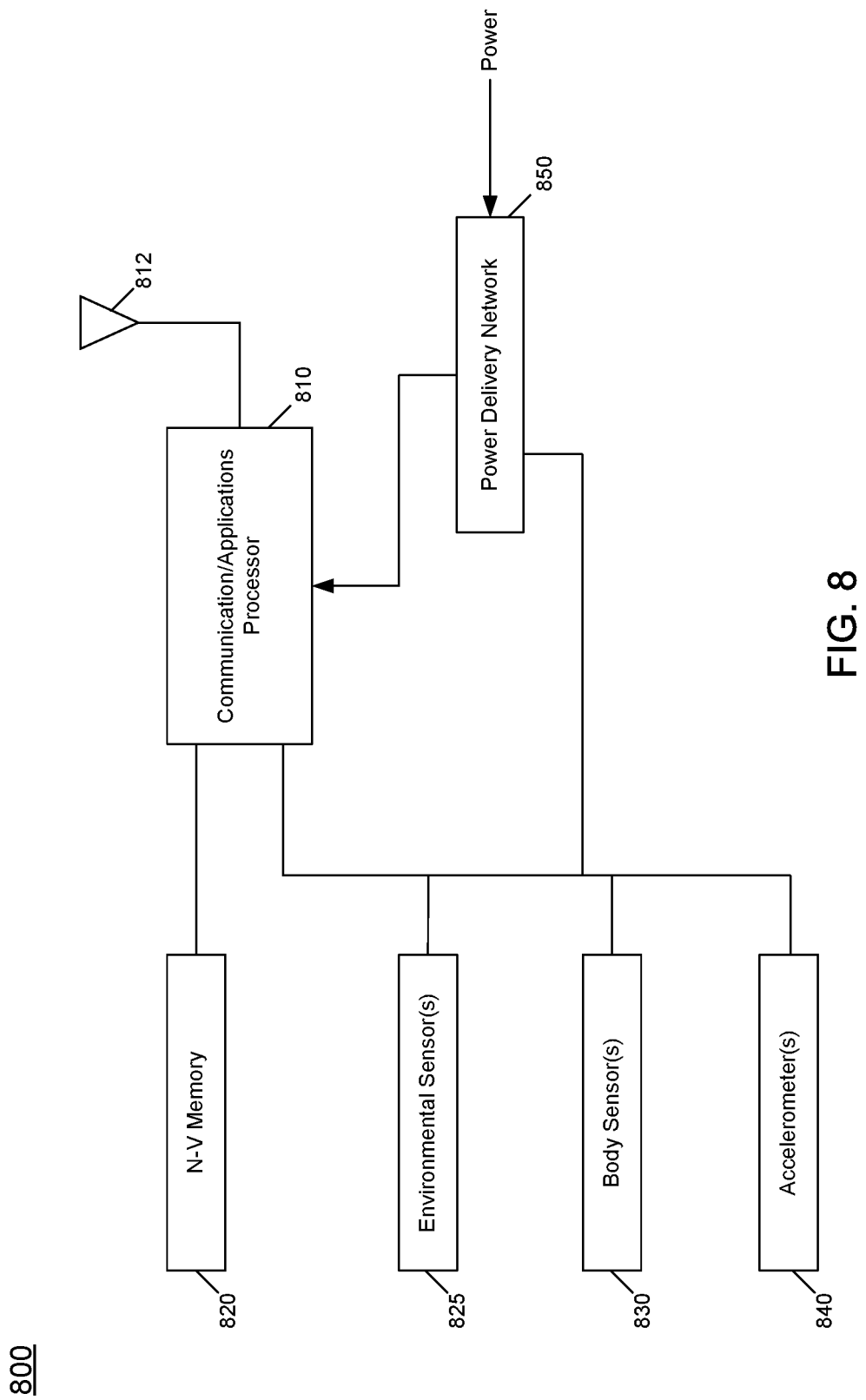
FIG. 8 is a block diagram of a system in accordance with another embodiment of the present invention.

FIG. 8 is a block diagram of a system 800 in accordance with another embodiment, which may be implemented as a smartphone, wearable device or so forth to obtain and use context information as described herein. As seen, system 800 includes a communications/applications processor 810, which may be a main processor of the system and which in turn may wirelessly communicate, e.g., according to at least a cellular communication protocol, via an antenna 812. Processor 810 may include control circuitry to perform, evaluate, adjust, discard or otherwise handle bioimpedance samples based at least in part on context information. As seen, additional components of system 800 include a non-volatile memory 820, which may be used to store a database of tokens, as well as an authentication policy. One or more proximity sensors 825 may be configured to indicate proximity of a user. In addition, user adaptation and user metrics can also be identified based at least in part on one or more body sensors 830, such as a bioimpedance sensor, EMG, PPG and/or galvanic skin potential sensors. In addition, system 800 includes one or more accelerometers 840, such as a multi-axis accelerator. In an embodiment, system 800 may be a rechargeable battery-powered device and thus a power delivery network 850 may include one or more voltage regulators, battery charger and so forth to receive power from a battery, as well as to provide a recharging current from an external connection, such as a wireless or USB connection to the battery. Understand while shown at this high level in the embodiment of FIG. 8, many variations and alternatives are possible.

The following examples pertain to further embodiments.

In one example, a system comprises: a bioimpedance sensor to generate bioimpedance information based on bioimpedance sample information from at least some of a plurality of electrodes to be adapted about a portion of a person; at least one biometric sensor to generate biometric information based on biometric sample information from at least some of the plurality of electrodes; at least one environmental sensor to generate environmental context data; and an integration circuit coupled to the bioimpedance sensor, the at least one biometric sensor and the at least one environmental sensor, the integration circuit to receive the bioimpedance information, the biometric information and the environmental context data and to adjust the bioimpedance information based at least in part on a value of one or more of the biometric information and the environmental context data.

In an example, the system comprises a wearable device including the bioimpedance sensor, the at least one biometric sensor and the at least one environmental sensor.

In an example, the wearable device further comprises a transceiver to send an indication of the authentication of the person to a second computing system.

In an example, the wearable device comprises a first semiconductor die including the bioimpedance sensor, the at least one biometric sensor, the at least one environmental sensor and the integration circuit.

In an example, the bioimpedance information comprises a bioimpedance image, and the integration circuit is to compare the bioimpedance image to a reference bioimpedance image and authenticate the person if the bioimpedance image matches the reference bioimpedance image to at least a threshold level.

In an example, the integration circuit is to discard the bioimpedance image and cause the bioimpedance sensor to generate another bioimpedance image if at least one of the biometric information and the environmental context data exceeds a corresponding threshold.

In an example, the integration circuit is to mask a portion of the bioimpedance image and compare an unmasked portion of the bioimpedance image to a corresponding unmasked portion of the reference bioimpedance image if at least one of the biometric information and the environmental context data exceeds a corresponding threshold.

In an example, the masked portion of the bioimpedance image includes bioimpedance image information regarding blood flow of the person.

In an example, the system further comprises a multiplexer coupled between the plurality of electrodes and the bioimpedance sensor, where the integration circuit is to control the multiplexer to provide a current signal to one or more of the plurality of electrodes and to provide voltage information from the at least some of the plurality of electrodes to the bioimpedance sensor.

In an example, the system further comprises at least one core comprising the integration circuit.

In an example, one or more of the bioimpedance sensor, the at least one biometric sensor and the at least one environmental sensor are local to the person and spatially separated from at least some of the plurality of electrodes.

In an example, the integration circuit can be located remotely from the person.

In another example, a method comprises: determining, in a first circuit of a device, whether a bioimpedance image generated from bioimpedance information of a user of the device matches a reference bioimpedance image of an authorized user of the device; authenticating the user if the bioimpedance image matches the reference bioimpedance image to at least a threshold level; if the bioimpedance image does not match the reference bioimpedance image to the at least threshold level, determining whether at least one biometric data and environmental context data is outside a corresponding threshold range; and preventing the user from being authenticated if the bioimpedance image does not match the reference bioimpedance image to the at least threshold level and the at least one biometric data and environmental context data is not outside the corresponding threshold range.

In an example, the method further comprises, if the at least one biometric data and environmental context data is outside the corresponding threshold range, adjusting the bioimpedance image based at least in part on the at least one biometric data and environmental context data that is outside the corresponding threshold range.

In an example, adjusting the bioimpedance image comprises masking at least a portion of the bioimpedance image.

In an example, adjusting the bioimpedance image comprises adjusting a signal level of at least a portion of the bioimpedance image.

In an example, the method further comprises: discarding the bioimpedance image if the at least one biometric data and environmental context data is outside the corresponding threshold range; and obtaining a new bioimpedance image.

In an example, the method further comprises authenticating the user if a plurality of portions of the bioimpedance image matches a corresponding plurality of portions of the reference bioimpedance image to at least the threshold level.

In an example, the method further comprises enabling one or more biometric sensors and one or more environmental context sensors to obtain the at least one biometric data and environmental context data in response to the bioimpedance image not matching the reference bioimpedance image.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a wearable device comprises: a bioimpedance sensor to generate bioimpedance information based on bioimpedance sample information from a user; at least one biometric sensor to generate biometric information based on biometric sample information from the user; at least one environmental sensor to generate environmental information based on environmental sample information; an integration circuit coupled to the bioimpedance sensor, the at least one biometric sensor and the at least one environmental sensor, the integration circuit to receive the bioimpedance information, the biometric information and the environmental information and to adjust the bioimpedance information based at least in part on a value of one or more of the biometric information and the environmental information; a security logic to generate a first token when the user adapts the wearable device in at least approximate contact to the user and based at least in part on the bioimpedance information, the first token including a first timestamp; a storage to store the first token and a second token, the second token obtained from an authenticator and associated with an authentication of the user to a second device, the second token including a second timestamp; and a communication module to communicate the first token and the second token to the second device to cause the second device to authenticate the user based on the first and second tokens.

In an example, the wearable device is to send the first token and the second token from the wearable device to a computing system to enable the computing system to automatically authenticate the user to the computing system based on the first token, the second token, and a security policy.

In an example, the bioimpedance information comprises a bioimpedance image, and the integration circuit is to mask a portion of the bioimpedance image and compare an unmasked portion of the bioimpedance image to a corresponding unmasked portion of a reference bioimpedance image if at least one of the biometric information and the environmental information is outside a corresponding threshold range.

In yet another example, an apparatus comprises: means for sensing bioimpedance information based on bioimpedance sample information from at least some of a plurality of electrodes to be adapted about a portion of a person; means for sensing biometric information based on biometric sample information from at least some of the plurality of electrodes; means for sensing environmental context data; and means for adjusting the bioimpedance information based at least in part on a value of one or more of the biometric information and the environmental context data.

In an example, the apparatus comprises a wearable device including the means for sensing bioimpedance information, the means for sensing the biometric information and the means for sensing the environmental context data.

In an example, the apparatus further comprises transceiver means for sending an indication of an authentication of the person to a second computing system.

In an example, the means for adjusting is to compare a bioimpedance image to a reference bioimpedance image and authenticate the person if the bioimpedance image matches the reference bioimpedance image to at least a threshold level.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a bioimpedance sensor to generate bioimpedance information based on bioimpedance sample information from at least some of a plurality of electrodes to be adapted about a portion of a person;
    at least one biometric sensor to generate biometric information based on biometric sample information from at least some of the plurality of electrodes;
    at least one environmental sensor to generate environmental context data; and
    an integration circuit coupled to the bioimpedance sensor, the at least one biometric sensor and the at least one environmental sensor, the integration circuit to receive the bioimpedance information, the biometric information and the environmental context data and to adjust the bioimpedance information based at least in part on a value of one or more of the biometric information and the environmental context data, wherein a first semiconductor die includes the bioimpedance sensor, the at least one biometric sensor, the at least one environmental sensor and the integration circuit, wherein the bioimpedance information comprises a bioimpedance image, and the integration circuit is to compare the bioimpedance image to a reference bioimpedance image and authenticate the person if the bioimpedance image matches the reference bioimpedance image to at least a threshold level, the integration circuit to mask a portion of the bioimpedance image and compare an unmasked portion of the bioimpedance image to a corresponding unmasked portion of the reference bioimpedance image if at least one of the biometric information and the environmental context data exceeds a corresponding threshold, the masked portion of the bioimpedance image including bioimpedance image information regarding blood flow of the person.

2. The system of claim 1, wherein the system comprises a wearable device including the bioimpedance sensor, the at least one biometric sensor and the at least one environmental sensor.

3. The system of claim 2, wherein the wearable device further comprises a transceiver to send an indication of an authentication of the person to a second computing system.

4. The system of claim 1, wherein the integration circuit is to discard the bioimpedance image and cause the bioimpedance sensor to generate another bioimpedance image if at least one of the biometric information and the environmental context data exceeds a corresponding threshold.

5. The system of claim 1, further comprising a multiplexer coupled between the plurality of electrodes and the bioimpedance sensor, wherein the integration circuit is to control the multiplexer to provide a current signal to one or more of the plurality of electrodes and to provide voltage information from the at least some of the plurality of electrodes to the bioimpedance sensor.

6. The system of claim 1, further comprising at least one core, the at least one core comprising the integration circuit.

7. The system of claim 1, wherein one or more of the bioimpedance sensor, the at least one biometric sensor and the at least one environmental sensor are local to the person and spatially separated from at least some of the plurality of electrodes.

8. The system of claim 7, wherein the integration circuit is located remotely from the person.

9. The system of claim 1, wherein if the bioimpedance image does not match the reference bioimpedance image to the at least threshold level, the integration circuit is to determine whether at least one biometric data and environmental context data is outside a corresponding threshold range, and prevent the person from being authenticated if the bioimpedance image does not match the reference bioimpedance image to the at least threshold level and the at least one biometric data and environmental context data is not outside the corresponding threshold range.

10. At least one non-transitory computer readable storage medium comprising instructions that when executed enable a system to:
    determine, in a first circuit of a device, whether a bioimpedance image generated from bioimpedance information of a user of the device matches a reference bioimpedance image of an authorized user of the device;
    authenticate the user if the bioimpedance image matches the reference bioimpedance image to at least a threshold level;
    if the bioimpedance image does not match the reference bioimpedance image to the at least threshold level, determine whether at least one biometric data and environmental context data is outside a corresponding threshold range; and
    prevent the user from being authenticated if the bioimpedance image does not match the reference bioimpedance image to the at least threshold level and the at least one biometric data and environmental context data is not outside the corresponding threshold range.

11. The at least one non-transitory computer readable medium of claim 10, further comprising instructions that when executed enable the system to, if the at least one biometric data and environmental context data is outside the corresponding threshold range, adjust the bioimpedance image based at least in part on the at least one biometric data and environmental context data that is outside the corresponding threshold range.

12. The at least one non-transitory computer readable medium of claim 11, wherein the adjustment to the bioimpedance image comprises to mask at least a portion of the bioimpedance image.

13. The at least one non-transitory computer readable medium of claim 11, wherein the adjustment to the bioimpedance image comprises to adjust a signal level of at least a portion of the bioimpedance image.

14. The at least one non-transitory computer readable medium of claim 10, further comprising instructions that when executed enable the system to:
    discard the bioimpedance image if the at least one biometric data and environmental context data is outside the corresponding threshold range; and
    obtain a new bioimpedance image.

15. The at least one non-transitory computer readable medium of claim 10, further comprising instructions that when executed enable the system to authenticate the user if a plurality of portions of the bioimpedance image matches a corresponding plurality of portions of the reference bioimpedance image to at least the threshold level.

16. The at least one non-transitory computer readable medium of claim 10, further comprising instructions that when executed enable the system to enable one or more biometric sensors and one or more environmental context sensors to obtain the at least one biometric data and environmental context data in response to the bioimpedance image not matching the reference bioimpedance image.

17. A wearable device comprising:
a bioimpedance sensor to generate bioimpedance information based on bioimpedance sample information from a user;
at least one biometric sensor to generate biometric information based on biometric sample information from the user;
at least one environmental sensor to generate environmental information based on environmental sample information;
an integration circuit coupled to the bioimpedance sensor, the at least one biometric sensor and the at least one environmental sensor, the integration circuit to receive the bioimpedance information, the biometric information and the environmental information and to adjust the bioimpedance information based at least in part on a value of one or more of the biometric information and the environmental information;
a security hardware circuit to generate a first token in response to the user adaptation of the wearable device in at least approximate contact to the user and based at least in part on the bioimpedance information, the first token including a first timestamp;
a storage to store the first token and a second token, the second token obtained from an authenticator and associated with an authentication of the user to a second device, the second token including a second timestamp; and
a communication circuit to communicate the first token and the second token to the second device to cause the second device to authenticate the user based on the first and second tokens.

18. The wearable device of claim 17, wherein the wearable device is to send the first token and the second token from the wearable device to a computing system to enable the computing system to automatically authenticate the user to the computing system based on the first token, the second token, and a security policy.

19. The wearable device of claim 17, wherein the bioimpedance information comprises a bioimpedance image, and the integration circuit is to mask a portion of the bioimpedance image and compare an unmasked portion of the bioimpedance image to a corresponding unmasked portion of a reference bioimpedance image if at least one of the biometric information and the environmental information is outside a corresponding threshold range, wherein the masked portion of the bioimpedance image includes bioimpedance image information regarding blood flow of the user.

* * * * *